United States Patent [19]
Fidric

[11] Patent Number: 5,978,528
[45] Date of Patent: *Nov. 2, 1999

[54] METHOD AND APPARATUS FOR REDUCING EXCESS PHOTON NOISE IN SHORT COHERENCE LIGHT SOURCES

[75] Inventor: Bernard G. Fidric, Woodland Hills, Calif.

[73] Assignee: Litton Systems, Inc., Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/832,419

[22] Filed: Apr. 2, 1997

[51] Int. Cl.$^6$ ........................................ G02B 6/26
[52] U.S. Cl. ............................. 385/24; 385/31; 385/76; 385/88
[58] Field of Search ................................. 385/24, 15, 27, 385/28, 30, 31, 38, 39, 48, 76, 88; 359/127

[56] References Cited

U.S. PATENT DOCUMENTS

| | | | |
|---|---|---|---|
| 4,588,255 | 5/1986 | Tur et al. ................................. | 385/24 |
| 4,637,025 | 1/1987 | Snitzer et al. . | |
| 4,652,079 | 3/1987 | Shaw et al. ............................. | 385/30 |
| 4,710,705 | 12/1987 | Kawabata ................................ | 324/102 |
| 4,768,853 | 9/1988 | Bhagavatula ............................ | 385/31 |
| 4,938,556 | 7/1990 | Digonnet et al. . | |
| 5,108,183 | 4/1992 | Fling et al. . | |
| 5,311,603 | 5/1994 | Fidric ..................................... | 385/11 |
| 5,313,480 | 5/1994 | Fidric et al. . | |
| 5,438,444 | 8/1995 | Tayonaka et al. ...................... | 359/123 |
| 5,680,120 | 10/1997 | Tillerman ............................... | 340/904 |

OTHER PUBLICATIONS

Siegman, Lasers, University Science Books.
Christian Hentschel, Fiber Optics Handbook, Hewlett–Packard.
Henri Hodara, Statistics of Thermal and Laser Radiation, Proceedings of the IEEE, Jul. 1965.

P.R. Morkel, R. I. Laming & D. N. Payne, Excess Photon Noise From High–Power Doped–Fibre Superfluorescent Sources, Jun. 1989.

K. Iwatsuki, Excess Noise Reduction in Fiber Gyroscope Using Broader Spectrum Linewidth Er–Doped Superluminescent Fieber Laser, IEEE Phototonics Technology Letters, vol. 3, No. 3, Mar. 1991.

R. P. Moeller and W. K. Burns, 1.06–$\mu$mAll Fiber Gyroscope With Noise Subtraction, Optics Letters, vol. 16, No. 23, Dec. 1, 1991.

H. Hodara, E. Miles, High–Speed Local Area Networks, Fiber and Integrated Optics, vol. II, pp. 253–276, 1992.

*Primary Examiner*—Rodney Bovernick
*Assistant Examiner*—Ellen E. Kang
*Attorney, Agent, or Firm*—Price Gess & Ubell

[57] ABSTRACT

A method and various structures are described for reducing excess photon noise in short coherence light sources, such as broadband superfluorescent fiber or superluminescent diodes, for example. The method contemplates splitting the light source signal into a plurality of components, thereby splitting, and reducing, the photon noise or "beat noise" as well as the light intensity. Each component travels in a separate path having a unique time delay which is longer than the coherence time of the light source. The light from each separate path is recombined at an output end, prior to detection, causing the signal to get back to its original intensity, while keeping the total beat noise at a reduced level. The paths may be created using different length polarization maintaining (PM) fibers, different length optical fibers, or multi-mode fibers having several propagation modes propagating at different rates.

18 Claims, 3 Drawing Sheets

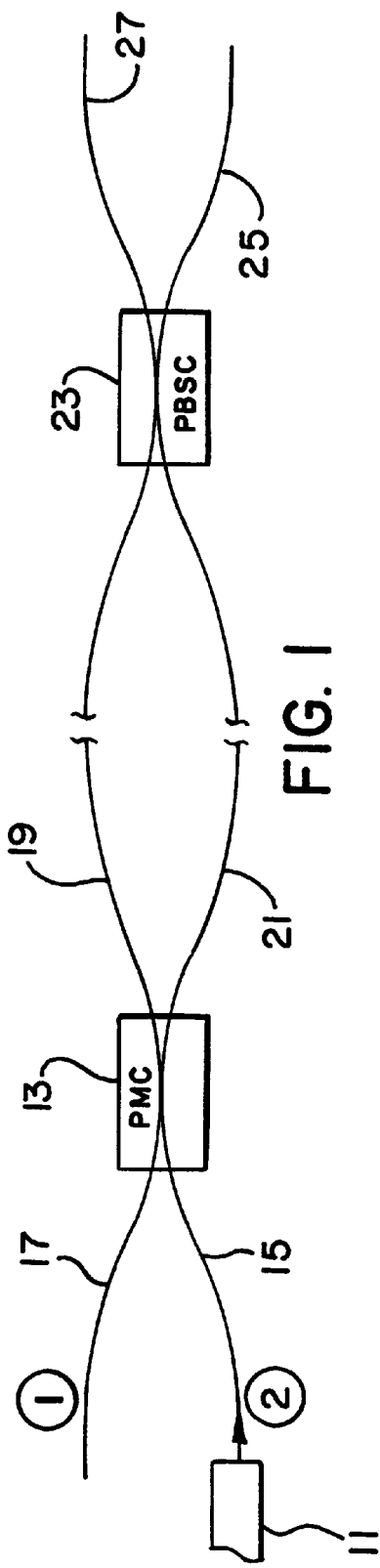
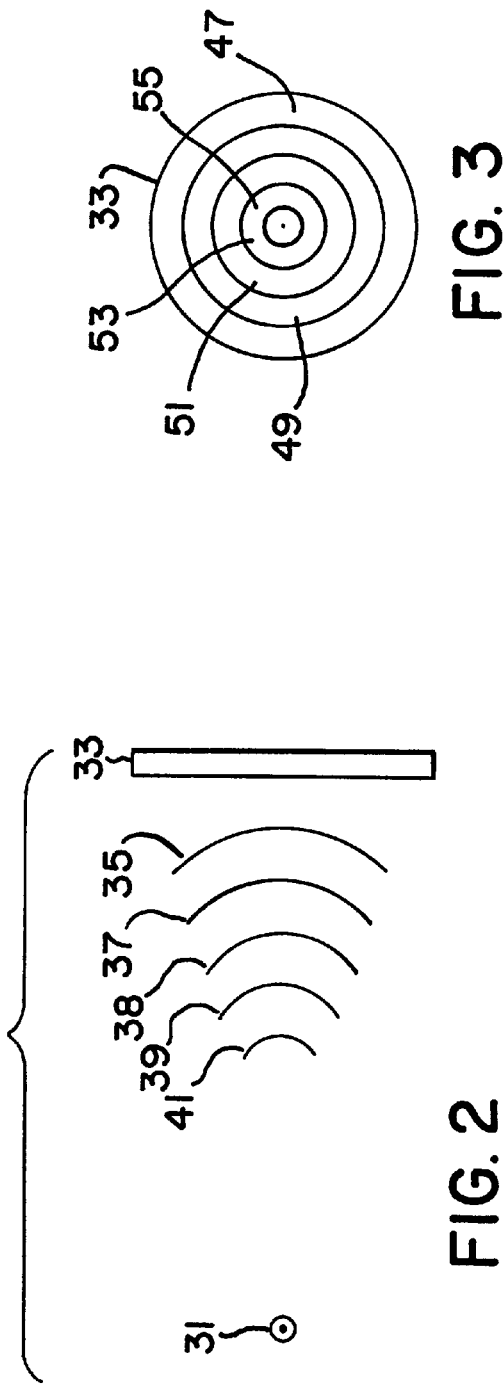

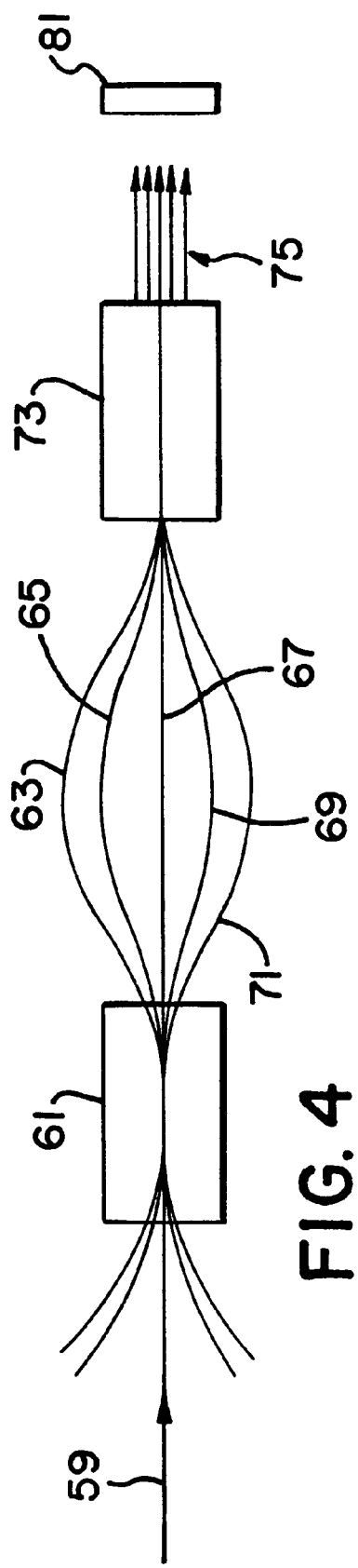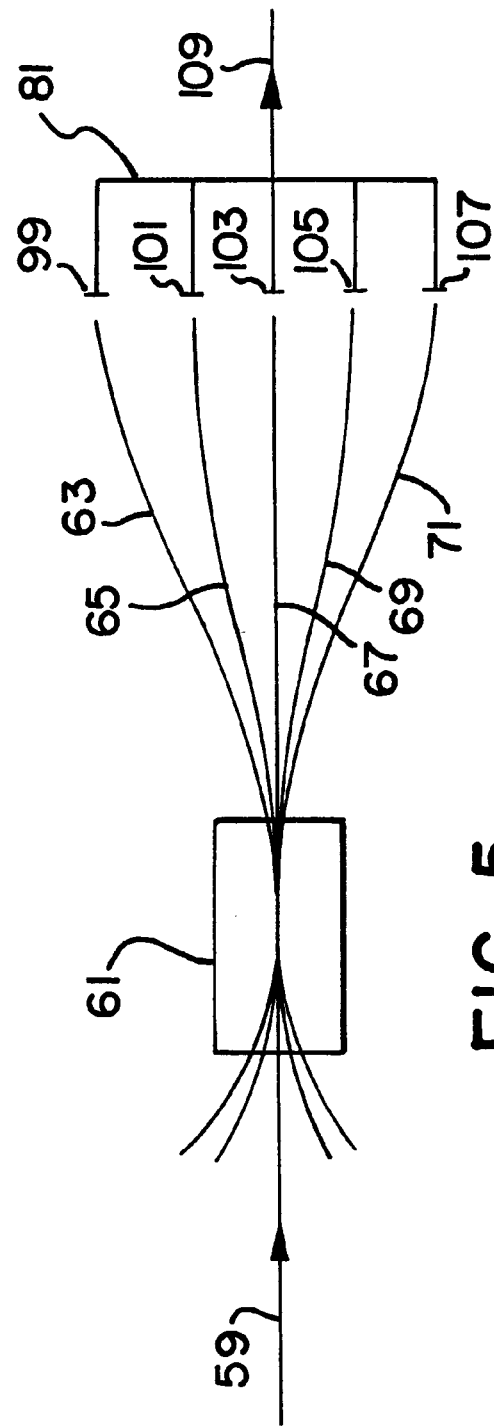

METHOD AND APPARATUS FOR REDUCING EXCESS PHOTON NOISE IN SHORT COHERENCE LIGHT SOURCES

BACKGROUND OF THE INVENTION

1. Field of the Invention

The present invention relates generally to improvements in superfluorescent laser light sources, and more particularly pertains to the reduction of excess photon noise in superfluorescent or short coherence laser light sources.

2. Description of Related Art

In the field of laser radiation, it has become known that light from an incoherent source exhibits random fluctuations in signal intensity which are caused by beats between the various randomly phased fourier components making up the linewidth of the source. These fluctuations are known as excess photon noise or wave interaction noise. Every laser source has these two noise components, shot noise and excess photon noise.

Such devices as fiber optic gyroscopes or optical time delay reflectometers (OTDR), which use short coherence light sources such as broadband fiber light sources or superluminescent diodes, for example, suffer from low signal to noise ratios. Increasing the light intensity does not necessarily increase the signal to noise ratio because excess photon noise is proportional to the square of the source intensity, while the shot noise is simply proportional to the average intensity.

The prior art has attempted to improve the signal to noise ratio of laser sources by various techniques. One technique described in *Optics Letters*, Vol. 16, No. 3, by R. P. Moeller and W. K. Burns, "1.06 µm all-fiber gyroscope with noise subtractor," p. 1902, Dec. 1, 1991, utilizes an optical and electronic configuration for noise subtraction. This method utilizes a plethora of equipment, including a plurality of fiber delay coils, detectors, amplifiers, multipliers, subtractors and polarizers. Another approach described in "Excess Noise Reduction in Fiber Gyroscope Using Broader Spectrum Rinwidth Er-Doped Superfluorescent Fiber Laser," by K. Iwatsuki, p. 281, March 1991, *IEEE Photonics Technology Letters, Vol.* 3. No. 3, attempts to reduce excess noise by utilizing rare earth-doped superfluorescent laser material. Other approaches, such as found in U.S. Pat. No. 5,311,603 for Highly Efficient Superfluorescent and Fiber Laser/Amplifier for Interferometric Sensors issued May 10, 1994, to Bernard G. Fidric, the present inventor, are directed to improving the light source itself.

Although the problem of reducing excess noise in a laser light source has been known for many years, with a variety of solutions being proposed, none suggest the solution of the present invention, which provides a more simple, direct and more efficient method and apparatus for reducing excess noise in a broadband laser light source.

SUMMARY OF THE INVENTION

The objects and general purpose of the invention are achieved by splitting a single mode light source into a plurality of components, each component directed to a separate path. The paths may be different polarization modes, spatial modes, λ optical paths, for example. Each path will cause a different time delay to the propagation of the light signal. Each delay is chosen to be larger than the coherence length of the light source. As a result, the excess photon noise is split among the plurality of paths, along with the light source signal. When the light source signals from each path are recombined, they add back to the intensity of the single mode light source. The excess photon noise, however, does not go back to its original light source level because the photon noise from the multiple paths is uncorrelated. The excess photon noise in the recombined light source remains at a level below that of the original light source. Recombining the uncorrelated optical components prior to detection of the light signal, creates a light signal with the same intensity as the light source, but with a higher signal to noise ratio.

BRIEF DESCRIPTION OF THE DRAWINGS

The exact nature of this invention, as well as its objects and attendant advantages will be readily appreciated as the same becomes better understood by reference to the following detailed description when considered in conjunction with the accompanying drawings in which like reference numerals designate like parts throughout the figures thereof and wherein:

FIG. 1 is a diagrammatic illustration of the first preferred embodiment of the invention;

FIG. 2 is a diagrammatic illustration of a second preferred embodiment of the invention;

FIG. 3 is a diagrammatic illustration of the detector in FIG. 2;

FIG. 4 is a diagrammatic illustration of a third embodiment of the invention;

FIG. 5 is a diagrammatic illustration of an alternate construction of the embodiment of FIG. 4.

DETAILED DESCRIPTION OF THE PREFERRED EMBODIMENTS

Figure 6:
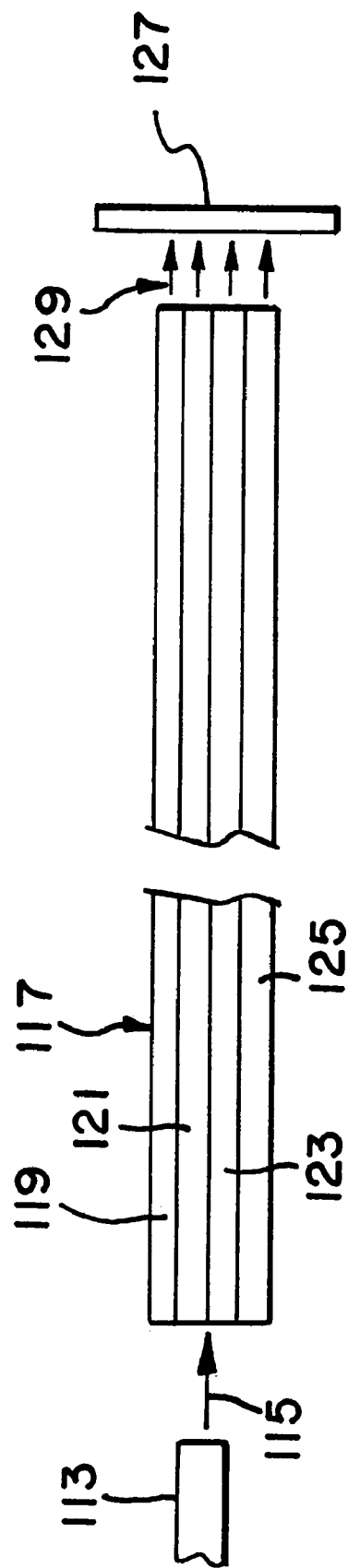
FIG. 6 is a diagrammatic illustration of yet another preferred embodiment of the present invention.

As is explained in Henry Hodara's paper, *Statistics of Thermal and Laser Radiation* in Proceedings of the IEEE, p. 696 (July 1965), total noise for laser radiation can be expressed by the equation:

$$<\Delta n^2> = <n> + <n>^2 (A<<A_c, \tau<<\tau_c) \tag{1}$$

where $A_c$ is the coherence area and $\tau_c$ is the coherence time of the wave fronts The first term on the right side of the equation is shot noise. The second term which is squared is excess photon noise. Hodara further expresses the total noise in terms of fluctuations per cell:

$$\langle \Delta n^2 \rangle = m \left\{ \frac{\langle n \rangle}{m} + \left(\frac{\langle n \rangle}{m}\right)^2 \right\} \tag{2}$$

which can be reduced to the equation:

$$\langle \Delta n^2 \rangle = \langle n \rangle \left(1 + \frac{\langle n \rangle}{m}\right) \tag{3}$$

If the inequalities of equation 1 are reversed and we note that $\tau_c$ and $\tau$ are inversely related to the optical linewidth B1 and the detector bandwidth B2, total noise is given by the expression:

$$\langle \Delta n^2 \rangle = \langle n \rangle + \langle n \rangle^2 \frac{A_c}{A} \frac{B_2}{B_1} \quad (A \gg A_c, \tau \gg \tau_c) \qquad (4)$$

Let us look at what contributes to the excess noise or beat noise, $<n>^2$ of this relationship. Assuming we have a light source that has a short coherence in the time domain, short coherence meaning broad linewidth, we have a light source that has a large number of frequency components. All these frequency components are incoherent with each other. These frequency components are sometimes effectively in-phase with each other and become additive, and at other times are out of phase with each other and become subtractive. As a result, the components can beat with each other to produce excess beat noise or excess noise. The effects of this noise is not periodic. It is noise and it is random. Although the noise manifests itself at a frequency that is the frequency difference between frequency components, it is not periodic. Sometimes the components add, sometimes they do not add.

It is the characteristic of a short coherence light source to produce a quantity of excess noise $<n>^2$ in addition to shot noise $<n>$. Shot noise is proportional to the average number of photons. Shot noise is the primary source of noise. It is proportional to the average number of photons and therefore the average intensity. Total noise is, however, the variance in terms of photon numbers or intensity $<\Delta n^2>$. The variance of the intensity, as shown in Equation (1), includes a second term, excess noise $<n>^2$, which is proportional to the square of the intensity. Relative intensity noise is the ratio of excess noise to signal strength or power. This invention applies only to short coherence length laser sources.

The term "short coherence" is a relative term. For example, a helium-neon (He:Ne) laser has a coherence length of a few meters to several tens of meters. A superluminescent diode laser source or a superfluorescent fiber laser source, on the other hand, has a coherence length of only 30 to 200 micro meters, a coherence length which is much less than one millimeter. Thus, a short coherence length is a relative term.

The excess noise that exists in laser radiation is detrimental to the operation of an optical gyroscope because it puts a limit on the random walk of a fiber optical gyro. Because the excess noise contribution to the total noise produced by a 10 microwatts to 20 microwatts source signal, for example, on a gyro detector exceeds the shot noise contribution, increasing the signal strength further does not significantly improve the random walk of the optical gyro because when you double the intensity, you also double the noise. So, the signal to noise ratio does not improve. If, however, the relationship was only shot noise limited, and the excess noise was minimal, the higher the intensity of the broadband light source, the higher the intensity of the signal and the lower the random walk of the optical gyro because the optical signal to noise ratio would be proportional to the square root of the intensity.

This is considerable incentive for reducing or eliminating the excess noise. If it is eliminated and the light source signal were only shot noise limited, then one could increase signal intensity by pumping the broadband fiber source harder and producing a reduction in the optical gyroscope random walk.

For a single polarization, single spatial mode light beam in the near $$\frac{A_c}{A} = 1,$$

in Equation (4) above.

FIG. 1 illustrates a first-preferred approach in reducing the excess noise factor using this relationship. A short coherence light source 11 supplies its light energy to a fiber optic input line 15 to input 2 of a polarization maintaining coupler (PMC) 13. No input is supplied on fiber optic line 17, input 1, to PMC 13. The polarization maintaining coupler 13 divides the light energy received on input line 15 into two equal halves for output on output lines 19 and 21, respectively. The polarization maintaining coupler 13 essentially takes the signal from the unpolarized short coherence light source 11 and splits it into the two components of light, a vertically polarized light component and a horizontally polarized light component. PMC 13 is effectively a 3 dB splitter. Both fibers 19 and 21 are polarization maintaining fiber (PM). Fiber 19 presents a different transit time to the signals introduced into it than does fiber 21 because the length of the fibers are different. The mismatch of the time delays $\Delta\tau$ in the path should be sufficiently large so that it is greater than the coherence time $\tau_c$ of the optical source 11. Because the optical source is superfluorescent, its coherence length, as noted above, is less than one millimeter. The length difference between the two paths 19 and 21, then, can be quite small. All that need be done is to provide a path length difference that is greater than one millimeter.

The other end of mismatched PM optical fibers 19 and 21 are supplied to a polarization beam splitting coupler (PBSC) 23. The PBSC 23 provides an output on its output fiber 27. Very little or no light whatsoever exits the lower output fiber 25. The output of PBSC 23 on fiber 27 is polarized because the PBSC and the birefringent fibers 19 and 21 produce polarized light. The light exiting the PBSC 23 is linearly polarized. This light is provided to a detector by the output fiber 27.

When a polarization beam splitting or combining coupler is used, two linearly polarized segments of light can be either separated or combined. PBSC 23 is combining the polarization components received over optical paths 19 and 21 to get all of the intensity from both lines out of the one port 27 as a linearly polarized light signal. Polarization beam splitting couplers, such as PBSC 23 used in FIG. 1, splice the two input fibers at 90 degrees in order to combine the two linearly polarized input components. Such couplers are well known and available from Photonetics. These couplers function to recover all the intensity initially put into fibers 19 and 21 by the short coherence source 11.

The PBSC 23 recombines the two polarization components of light that was split by PMC 13. However, because the two polarized light components experienced two different transit or delay times with the mismatch being longer than the coherence length of the light source 11, the excess noise in the two polarization components are uncorrelated with each other. Therefore, upon recombining the excess noise will not add as strongly. For example, for two uncorrelated noise sources of equal noise amplitude:

$$\sigma_T = \sqrt{\sigma_1^2 + \sigma_2^2} \qquad (5)$$
$$\cong \sqrt{2}\,\sigma_1$$

where: $\sigma_T$ is the total noise amplitude (standard deviation)
where: $\sigma_1$ is the noise amplitude of one source where: $\sigma_2$ is the noise amplitude of second source As compared to total noise variance for two correlated noise sources:

$$\sigma_T = \sqrt{\sigma_1^2 + \sigma_2^2 + 2\sigma_1\sigma_2} \quad (6)$$

$$\cong \sqrt{4}\,\sigma_1$$

$$\cong 27\sigma\tau$$

The noise amplitude for two correlated noise sources is larger.

Referring now to FIG. 2, an alternate preferred embodiment for dividing a single light source signal into multiple light components with uncorrelated noise contents is illustrated. It is well known that as light exists a single mode fiber 31, it exists as a cone. After some distance from the fiber end 31, called the Rayleigh range, the light propagates as a cone. The phase fronts appear as spheres, as illustrated by propagating spheres 35, 37, 38, 39 and 41. If a detector 33, which is typically a flat surface, is positioned far enough from the tip of the fiber 31, the phase fronts 35, 37, 38, 39 and 41 of the light propagating from the fiber tip 31 would impinge onto the surface of the detector as curved phase fronts. That is, that light that enters at the center of the detector 55 (FIG. 3) impinges on it earlier than the light at the outer rings 47.

In order to enhance the divergence angle between the phase fronts of the propagating wave, a very small mode field diameter may be utilized. This can be created by using a very small core diameter by, for example, tapering the core diameter down or by flashing an arc to produce a cone effect at the end of the fiber 31. These are only two examples of ways to make the divergence angle of the fiber end 31 smaller.

The fiber 31 must be placed at a distance from the detector 33 that is sufficient to create several spatial coherent cells, each having a relative path delay longer than the coherence length of the light source 31. The detector 33 (FIG. 3) is structured to have a variety of rings, 47, 49, 51, 53, and 55. Each ring is at a distance from the previous ring which is greater than the coherence length of the light source 31. These rings may be structured as separate detectors or they may be segmented detectors, for example.

As the radius of a detector ring size increases, it might be expected that its bandwidth will decrease. That tendency can be compensated for by segmenting the respective rings or by diminishing the width of the respective rings to hold its area constant as the radius continues to increase. The ring distance and the divergence angle of the light of the propagating phase fronts of light work together to establish n spatial coherence cells on the detector 33. The detector gathers the received light to recover essentially all the signal while the noise is split between the several rings.

The Rayleigh range that must be utilized depends on the core diameter of the single mode fiber 31. The smaller the core diameter, the shorter the Rayleigh range. An equation that expresses this relationship found in a text by Anthony Siegman called "Lasers" is illustrated below:

The Rayleigh range marks the approximate dividing line between the "nearfield" or Fresnel and the "far field" or Fraunhofer regions for a beam propagating out from a gaussian waist $Z_R = \pi W_O^2/\lambda$: Rayleigh range $W_O = a(0.65 + 1.619/V^{3/2} + 2.879/V^6)$: beam radius at the point of $1/e^2$ power density a: core radius of the single mode fiber v: normalized frequency As can be seen by the previous two preferred embodiments shown in FIGS. 1–3, the general concept is to try to reduce the level of excess noise while not impacting or paying a penalty on the total intensity. In order to reduce the excess noise, we split the intensity signal and, thereby, the excess noise as well. While the components are split, we decorrelate the noise components by creating a delay differential between the different noise components that is longer than the coherence length of the light source. Thereafter, we combine the light components and decorrelated noise components in order to get back the original intensity light signal with a reduced excess noise signal. Care must be taken, however, to avoid introducing too much delay so that the light signal of interest does not begin to experience degradation as a result of the excess noise decorrelation process. Care must also be taken with the bandwidth of the detector.

Although FIG. 1 illustrated a preferred embodiment utilizing polarization maintaining fiber, the invention does not require that polarization maintaining fiber be used. For unpolarized single spatial mode light beams $$\frac{A_c}{A} = \frac{1}{2}.$$

Refer, for example, to FIG. 4 which shows an alternate preferred embodiment which utilizes a plurality of optical path fibers. Light 59 enters a first coupler 61, which splits the light into n components. In the example of FIG. 4, each one of the five components enters one of the coupler arms, 63, 65, 67 69 and 71. Each coupler arm which is a different optical path has a different optical path length. Each of these arms are coupled to the input of a second coupler 73, which provides all of the five outputs to the surface of a detector 81.

FIG. 5 is a slight variation of the preferred embodiment of FIG. 4 in that the detector 81 is shown as having a plurality of discrete detector cells 99, 101, 103, 105 and 107 for each one of the coupler arms 63, 65, 67, 69 and 71, respectively.

In either version, when the light components are recombined, the excess noise is subject to the decorrelating effects, as described above, resulting from the coupling arm fibers having different lengths.

In addition to polarized and unpolarized single spatial mode propagation, the present invention may be implemented by the use of p propagation modes which are properly delayed with respect to one another. That means the differential optical path distances are greater than the coherence length of the light source. In such case, $$\frac{A_c}{A} = \frac{1}{p}.$$

This permits the utilization of a multi-mode fiber 117 as illustrated in FIG. 6, which receives a light source signal 115 from an unpolarized light source 113, such as from a single mode fiber. The multi-mode fiber 117 is illustrated as having four modes, 119, 121, 123 and 125. The mode segments of the multi-mode fiber introduce a delay so that the various modes of light propagating through the multi-mode fiber 117 do not propagate at the same speed. With enough length on a multi-mode fiber, decorrelation between the modes occurs and the excess noise associated with each respective mode or component of light is decorrelated. There must be enough length in the multi-mode fiber 17 to provide sufficient delay between the various modes, remembering that the delay must be greater than the coherence length of the light source 115.

At the output of the multi-mode cable 117, the light source 129 is coupled to a detector 127. An index-matched optical cement or any other suitable coupling means may be used. This not essential, however. For some applications, an air gap may be utilized. In such case, however, care should be taken not to create a reflective effect. An appropriate angle or coating may be necessary to prevent reflections from reentering the fiber 117. For instance, detectors from a company such as Epitaxx in West Trenton, N.J., or from OCP in Chatsworth, Calif., can be used.

What is claimed is:

1. A method for reducing excess photon noise contained in a short coherence single mode light source, the steps of the method comprising:

dividing the light source containing a level of excess photon noise into multiple lower power intensity components, each lower intensity component containing a lower level of photon noise and a lower level of light;

directing each component to its own path, each path imposing a different time delay, each different time delay being greater than the coherence time of the single mode light source; and recombining the lower power intensity components so that most of the light intensity of the components reaches a detector to recombine, while the excess photon noise levels do not recombine, whereby the recombined light contains an excess photon noise level that remains lower.

2. The method of claim 1 wherein said dividing step comprises splitting the single mode light source into multiple polarized power level components, and wherein said recombining step comprises recombining the polarized light components.

3. The method of claim 1 wherein the dividing step comprises positioning the output end of a single mode fiber at a distance from a detector so that the multiple components are a plurality of spatial coherent cells propagating as curved wave fronts to the detector, each cell having a path delay longer than the coherence length of the source.

4. The method of claim 1 wherein the dividing step comprises splitting the light source into a plurality of unpolarized power intensity components, one power component per its respective optical coupler path, each optical coupler path having a different length.

5. The method of claim 4 wherein the recombining step comprises bundling the outputs of the optical coupler paths onto a photo detector.

6. The method of claim 1 wherein the dividing step comprises splitting the single mode light source into a plurality of different modes, each mode propagating at a different speed.

7. The method of claim 6 wherein the recombining step consists of coupling the plurality of different modes of the light source to a detector.

8. An apparatus for reducing excess photon noise contained in a short coherence single mode light source, said apparatus comprising:

means for dividing the light source containing a level of excess photon noise into multiple lower power intensity components, each lower intensity component containing a lower level of photon noise and a lower level of light;

multiple separate paths of travel, one for each component, each path having a different time delay, each time delay being greater than the coherence time of the light source; and means for recombining the lower power intensity components so that most of the light intensity of the components reaches a detector to recombine, while the excess photon noise levels do not recombine, whereby the recombined light contains an excess photon noise level that remains lower.

9. The apparatus of claim 8 wherein said dividing means comprises a polarization maintaining coupler for dividing the light source into polarization components and a plurality of birefringent fiber paths, one for each polarization component.

10. The apparatus of claim 9 wherein said polarization maintaining coupler divides the single mode light source into vertically polarized light and horizontally polarized light.

11. The apparatus of claim 9 wherein said recombining means comprises a polarization beam splitting coupler connected to recombine the polarization components.

12. The apparatus of claim 8 wherein said dividing means comprises the output end of a single mode fiber being positioned from a detector at a distance equal or greater than the Rayleigh range.

13. The apparatus of claim 12 wherein said recombining means comprises a detector having a plurality of rings on its surface, each ring being a separate detector.

14. The apparatus of claim 8 wherein said dividing means comprises a light splitting coupler that splits the light source into a plurality of unpolarized components, and directs each light component to a separate optical path, each path having a different length.

15. The apparatus of claim 14 wherein said recombining means comprises a coupler receiving the light components on each optical path and provides the outputs to a photo detector.

16. The apparatus of claim 8 wherein said dividing means comprises a multi-mode fiber of sufficient length.

17. The apparatus of claim 16 wherein said recombining means comprises a photo detector.

18. The apparatus of claim 17 wherein the output end of said multi-mode fiber is attached to the photo detector by optical cement.

* * * * *